United States Patent [19]
Salazar

[11] Patent Number: 6,073,141
[45] Date of Patent: Jun. 6, 2000

[54] SYSTEM AND METHOD FOR SYNCHRONIZING LOCAL VERSIONS OF DATABASE

[75] Inventor: Fernando Salazar, Arlington, Mass.

[73] Assignee: International Business Machine Corporation, Armonk, N.Y.

[21] Appl. No.: 08/977,891

[22] Filed: Nov. 25, 1997

[51] Int. Cl.[7] .................................................. G06F 17/30
[52] U.S. Cl. .................. 707/204; 707/10; 707/8
[58] Field of Search .................. 707/8, 2, 104, 707/204, 10; 395/500, 425; 379/88

[56] References Cited

U.S. PATENT DOCUMENTS

| | | | |
|---|---|---|---|
| 5,136,707 | 8/1992 | Block et al. ................................. | 707/8 |
| 5,142,470 | 8/1992 | Bristow et al. ......................... | 364/184 |
| 5,404,488 | 4/1995 | Kerrigan et al. ........................ | 395/425 |
| 5,721,914 | 2/1998 | De Vries ................................. | 707/104 |
| 5,740,230 | 4/1998 | Vaudreuil ................................. | 379/88 |
| 5,867,688 | 2/1999 | Simmon et al. ........................ | 395/500 |
| 5,870,733 | 2/1999 | Bass et al. ................................. | 707/2 |
| 5,924,096 | 7/1999 | Draper et al. ............................. | 707/10 |

OTHER PUBLICATIONS

*EMA Directory Resource Center*, May 4, 1998, 3 pages.
*EMA Directory Resource Center: Electronic Directory References*, May 4, 1998 2 pages.
*EMA Directory Resource Center, Production and Test Directories*, May 4, 1998, 1 page.
*EMA Directory Resource Center, Electronic Directory Vendors*, May 4, 1998, 1 page.
*Lotus Notes of Jan. 23, 1997*, May 4, 1998, 3 pages.
*Defense Message System—Army*, May 4, 1998 2 pages.
*What is DMS?*, May 4, 1998, 4 pages.
*Lotus Notes DMS Nears Completion of GOSIP Product Testing*, dated Jun. 4, 1996, 3 pages.
*DISA, JITC Registers for GOSIP/POSIT and DMS*, May 4, 1998, 3 pages.
*Defense Message System (DMS) Public Web Site*, May 4, 1998, 1 page.
*What's New at DISA?*, May 4, 1998, 2 pages.
*More About DMS*, May 4, 1998, 1 page.
*Defense Message System*, May 4, 1998, 2 pages.
*Lockheed Martin DMS Overview*, May 4, 1998, 1 page.
*Lockheed Martin DMS Product Information*, May 4, 1998, 1 page.
*Lockheed Martin DMS Products and Services*, May 4, 1998, 2 pages.
*DMS System Manual 1.0*, May 3, 1997, by Lockheed Martin Federal Systems, 371 pages.
Sara Radicati, *X.500 Directory Services: Technology and Deployment*, 1994, entire book.
Marshall T. Rose, *The Little Black Book: Mail Bonding with OSI Directory Services*, 1992, entire book.

*Primary Examiner*—Thomas G. Black
*Assistant Examiner*—Frantz Coby
*Attorney, Agent, or Firm*—Hunton & Williams

[57] ABSTRACT

A computer system for providing a current set of records to a plurality of users. The system includes a master database which stores a master set of a plurality of records and a plurality of terminals in communication with the master database. Each of the terminals stores a subset of the master set of records. The system also includes a device that receives input regarding updates to the plurality of users and has a single point of entry to the master database. The input receiving device stores the updates in the master database. The system provides a mechanism that indicates which records have been updated since a predetermined period of time. The system also includes a retrieving device that is responsive to the indicating mechanism and retrieves one or more of the updated fields from the master database and provides those fields to one or more of the terminals. An updating device associated with one or more of the terminals is provided for updating each of the subsets on each of the terminals with the updated fields provided by the retrieving device. A sharing device is provided for sharing the updated fields with at least one of the terminals.

20 Claims, 3 Drawing Sheets

SYSTEM AND METHOD FOR SYNCHRONIZING LOCAL VERSIONS OF DATABASE

FIELD OF THE INVENTION

The invention relates to a system for maintaining a plurality of records, and more particularly, to a system for synchronizing a plurality of records.

BACKGROUND OF THE INVENTION

Systems for updating records per se, are known. These systems typically maintain a central database which stores a primary set of records, for example an electronic address book containing the names of all of the users of a system and/or network. The central database may be, for example, the Worldwide Defense Messaging System Directory (also known as the X.500 directory). Attached systems access and retrieve information from the central database and store it in a local cache. Periodically, information in the central database is updated with current information. For the attached systems to maintain up-to-date records, those systems require the entire set of records to be retrieved and compared with the information stored in the local cache. The attached system compares each record contained in its local cache with the record stored in the central database. If two of the same records do not match, the system updates the local cache with the most recent entry in the central database. This process is repeated for all records contained in the central database. This is required every time a system user desires the information to be updated. Depending on the number of records contained in the central database, the amount of time required to complete the update could be quite lengthy. Additionally, each system requiring an update needs to individually perform this task. This results in duplicative processes and reduced processing capabilities. Furthermore, if one system user does not maintain current records while another does, the user that does not maintain updated records may be using incorrect information. This leads to non-uniformity in the information that users of the same (or different) systems may be using.

SUMMARY OF THE INVENTION

One object of the invention is to overcome these and other drawbacks of existing systems.

Another object is to provide a system for maintaining current records by periodically refreshing the records stored in a local system with updated information stored in a master database.

Another object is to provide a system for maintaining current records that retrieves from the master database only that information which has changed since a previous update.

Another object is to provide a system for maintaining current records that accesses the master database only when necessary.

Another object is to provide a system for maintaining current records that allows systems that access the master database to replicate and share the information retrieved among one or more systems accessing the same master database.

To accomplish these and other objects, one embodiment of the invention comprises a computer system for providing a current set of records to a plurality of users. The system comprises a master database which stores a master set of a plurality of records and a plurality of terminals in communication with the master database. Each of the terminals stores a subset of the master set of records. The system also comprises a device that receives input regarding updates to the plurality of users and has a single point of entry to the master database. The input receiving device stores the updates in the master database. The system provides a mechanism that indicates which records have been updated since a predetermined period of time. The system also comprises a retrieving device that is responsive to the indicating mechanism and retrieves one or more of the updated fields from the master database and provides those fields to one or more of the terminals. An updating device associated with one or more of the terminals is provided for updating each of the subsets on each of the terminals with the updated fields provided by the retrieving device. A sharing device is provided for sharing the updated fields with at least one of the terminals.

The invention also provides a method for providing a current set of records having a plurality of fields to a plurality of users. First, a master set of a plurality of records is stored in a master database. A subset of the plurality of records is stored in each of a plurality of terminals provided in communication with the master database. Input is received regarding updates to the plurality of records. The updates are stored in the master database and indicated as having been changed since a previous update. One or more updated fields are retrieved from the master database and provided to one or more of the terminals. The subset is updated on a terminal using the updated fields. The updated fields are then shared with at least one other terminal.

According to one embodiment of the invention, a system is provided that automatically updates a personal electronic address book using DMSSYNC (which will be described in greater detail below). Users of a local system build a personal address book that is stored in a local cache of the system using information obtained from a global address book. Periodically, the local system retrieves and verifies that entries in the local address book are current. If the entry stored in the local system does not match the information stored in the global address book, then the system automatically updates the entry with the current information. The system uses a "pull" style synchronization method. This method retrieves only that information which has changed since a previous update.

The order in which the updates are processed is determined by priorities assigned to each of the entries according to an Auto Update feature (which will be described in greater detail below). Each entry may be assigned a high or standard (or other) priority by the administrator of the system. The system may be configured to process entries according to priority, for a predetermined amount of time, etc. The configuration may be done by an administrator of the system or manually.

DETAILED DESCRIPTION OF THE PREFERRED EMBODIMENTS

Figure 1:
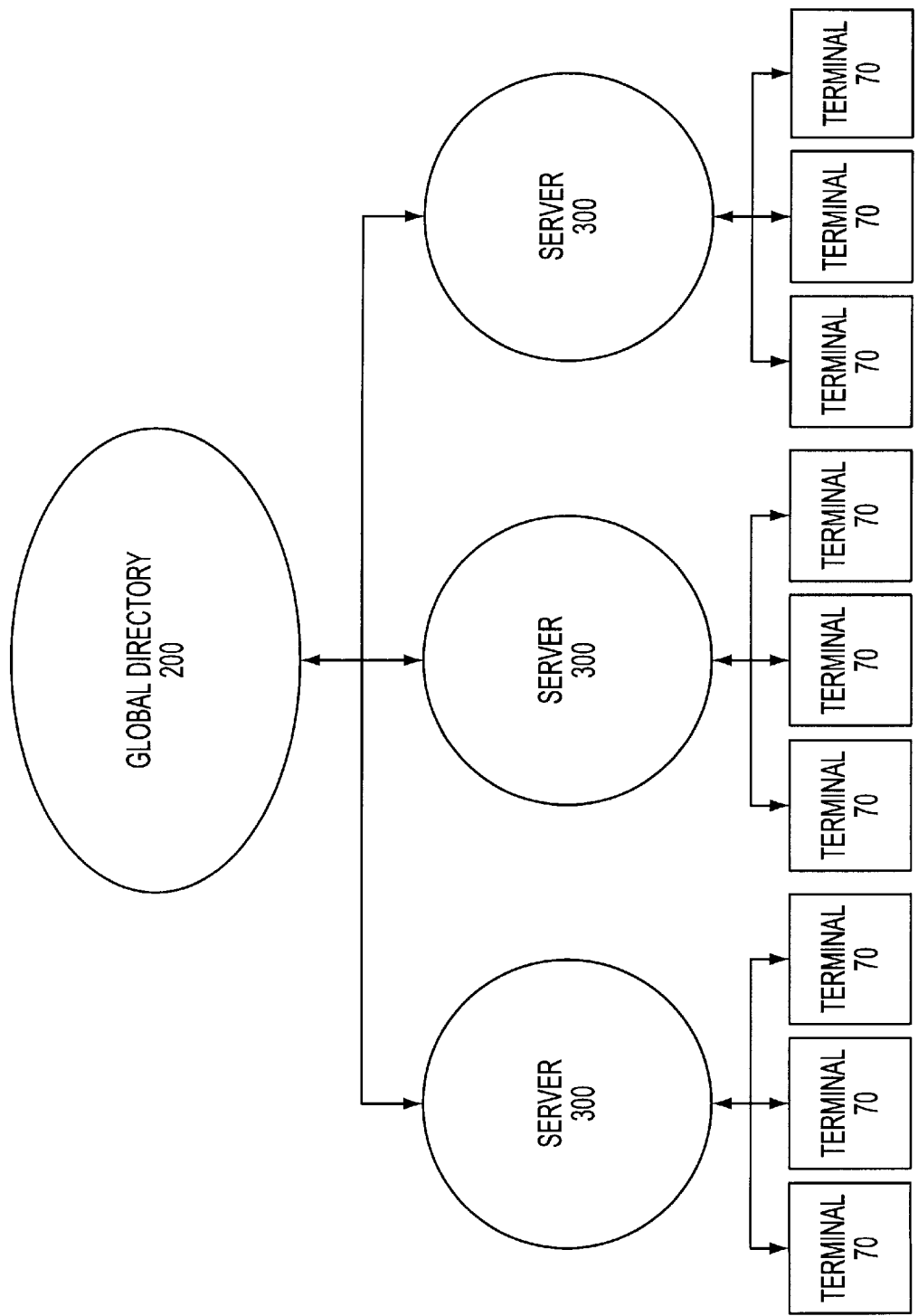
FIG. 1 is a block diagram of an overall system according to an embodiment of the invention.

According to an embodiment of the invention, a system is provided that permits electronic address books to be updated automatically and possibly, on a scheduled basis. FIG. 1 shows an overall system according to an embodiment of the invention. System 10 comprises a server 300 in communication with a global directory 200 (e.g., the X.500 directory) and at least one terminal 70. Server 300 is composed of a storing object 30, an indicating object 40, an input receiving object 50, and an updating object 60 (see FIG. 2). Terminals 70 may be a personal computer, a laptop computer, or any other type of processing equipment. Server 300 retrieves the address books stored in terminals 70 and the entries in the global directory 200 corresponding to the entries listed in the address books. Server 300 compares the entries in the address book with the entries in global directory 200. If the entries do not match, server 300 retrieves the information from global directory 200 using a "pull" style synchronization (although other methods may also be used). Server 300 updates the entry or entries in the address book with the information stored in global directory 200 as described in more detail below.

Figure 2:
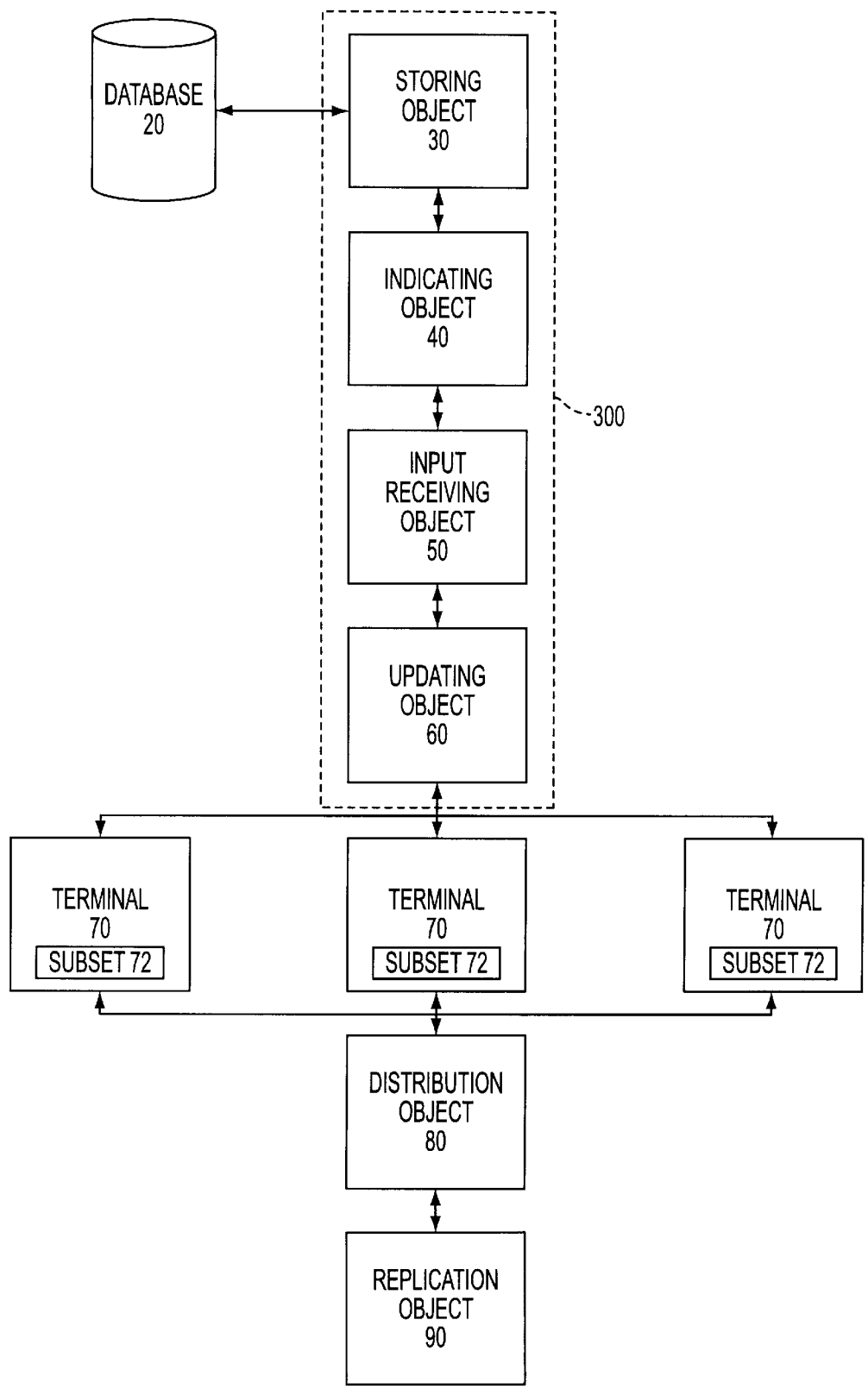
FIG. 2 is a block diagram of the overall system according to another embodiment of the invention.

FIG. 2 shows a block diagram illustrating a system 10 for updating, replicating, and distributing records among a plurality of terminals 70. Storing object 30 stores and updates records (e.g., address book entries) in a database 20. When records to be stored are replacing an outdated version, an indicating object 40 marks those records as having been changed since a previous update. The indicator may be a date stamp, date/time stamp, etc. The date or date/time stamp may be a "last-modified" stamp indicating the date of the most recent update. Input receiving object 50 retrieves from database 20 only those records, or fields within those records, that have been indicated as changed and forwards those records to one or more updating objects 60. Each updating object 60 then updates the records stored in the subsets 72 of one or more terminals 70. A distribution object 80, connected to terminals 70, retrieves the records or fields that have been updated in subset 72 of one or more of terminals 70, and transmits those records to a replication object 90. Replication object 90 copies the updated records and passes those records to distribution object 80 for sharing among terminals 70. In this manner, each terminal may divide the amount of records that need updating among a plurality of terminals 70, thereby reducing the amount of time required, as well as increasing processing capability.

Figure 3:
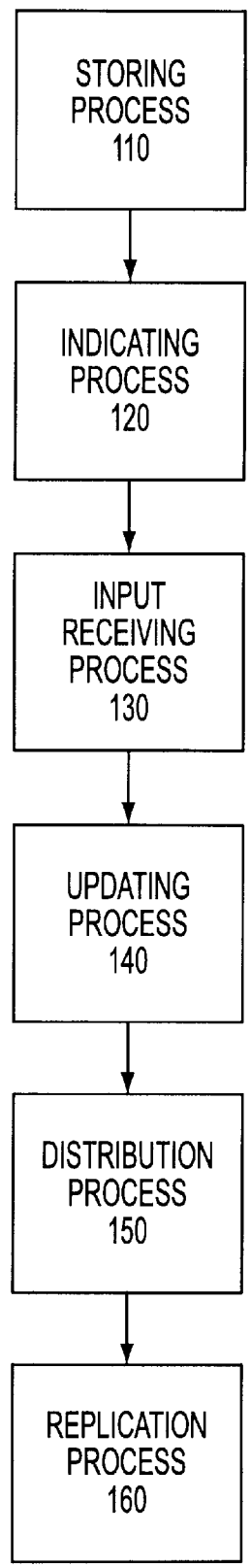
FIG. 3 is a block diagram illustrating a method of updating records in accordance with an embodiment of the invention.

FIG. 3 shows a method for updating, replicating, and distributing records among a plurality of terminals 70. A storing process 110 stores and updates records (e.g. address book entries) in a database 20. Indicating process 120 marks the records or fields that are being stored in database 20 as having been changed since a previous update. Input receiving process 130 retrieves from database 20 only those records or fields that have been indicated as changed and forwards those records to an updating process 140. Updating process 140 then updates the records or fields stored in the subsets 72 of the terminals 70. Distribution process 150 retrieves the records that have been updated in subset 72 of one or more of terminals 70. Replication process 160 copies the updated records or fields. Distribution process 150 then distributes the updated records and/or fields among terminals 70 and updates subsets 72 of each of those terminals 70.

DMSSYNC

One embodiment of the invention comprises a DMSSYNC object task. The DMSSYNC task updates the user name list contained in the address books. Address book entries may be designated as either high priority or standard priority or any other type of priority. DMSSYNC is highly configurable which gives the administrator flexibility in performing updates. DMSSYNC allows updates to be ordered according to entry priority or for registration. Because DMSSYNC is a synchronous operation, the first operation is completed before the second operation may begin, although it is possible to have the DMSSYNC as a asynchronous operation. Updates may also be completed according to time of day, time spent processing an update, etc. Although the sequence of updates may be varied and a time limit placed on an update interval, it is recommended that entries having a high priority be completed first, and that the process continue until all high priority entries have been updated, regardless of the amount of time spent. In this manner, the system assures that all consequential entries contain current information. When updating standard entries, it is preferable that the update continue until the maximum amount of time that has been pre-set by the administrator has been reached. The DMSSYNC operation may be set-up so that it runs automatically, or the administrator may manually begin the update process by inserting certain commands relating to the type of update desired. For example, the administrator may wish to update entries having an immediate priority, standard priority or only a specific entry.

Auto Update

The auto update feature of the system operates such that there is only one point of entry. Because address book entries are created in numerous points throughout the system, the system allows updates to be processed from a single point without having to perform the updates at each of these individual locations. Also, because address books are replicas of the information provided in the global (e.g., X.500) directory, they are refreshed automatically. Address books are also replicated between servers. This allows for synchronization between the global (e.g., X.500) directory and the local subsets. It is preferable that the automated updates be processed using C-language for increasing the speed, versatility and configurability of the program, however, scripts or other types of languages may also be used.

Other embodiments and uses of the invention will be apparent to those skilled in the art from consideration of the specification and practice of the invention disclosed herein. The specification and examples should be considered exemplary only. For example, the invention is not limited to use in updating address books only, and may be used with other types of records. The intended scope of the invention is only limited by the claims appended hereto.

What is claimed is:

1. A computer system for providing a current set of records to a plurality of users, the records having a plurality of fields, the system comprising:

a master database means for storing a master set of a plurality of records, the records having a plurality of fields;

a plurality of terminals in communication with said master database means;

each of said terminals storing a subset of said plurality of records;

input receiving means for receiving input regarding updates to said plurality of records from the master database;

storing means for storing said updates in said master database means;

indicating means for indicating the fields that have been updated since a previous update;

retrieving means, responsive to the indicating means, for retrieving one or more updated fields from the master database means and providing that to one or more of said terminals;

updating means, associated with one or more terminals, for updating the subset on a terminal using the updated fields provided by the retrieving means; and means associated with each terminal for sharing the updated fields with at least one other terminal.

2. The computer system according to claim 1, wherein said input receiving means comprises a single point of entry to said means for storing a master set of a plurality of records.

3. The computer system according to claim 1, wherein said records are address book entries.

4. The computer system according to claim 1, wherein said fields are selected from the group consisting of: user name, electronic mail address, telephone number, address, job title, job department, and employer.

5. The computer system according to claim 1, wherein said indicating means is a field containing a date stamp.

6. A method for providing a current set of records having a plurality of fields to a plurality of users, the method comprising the steps of:

storing a master set of a plurality of records in a master database means, the records having a plurality of fields;

providing a plurality of terminals in communication with said master database means;

storing a subset of said plurality of records in each of said terminals;

receiving input regarding updates to said plurality of records from the master database means;

storing said updates in said master database means;

indicating the fields that have been updated since a previous update;

retrieving one or more updated fields from the master database means and providing that to one or more of said terminals;

updating the subset on a terminal using the updated fields provided by the retrieving means; and sharing the updated fields with at least one other terminal.

7. The method of claim 6, wherein the updating step is processed automatically.

8. The method of claim 7,.

9. The method of claim 8, wherein the updating step is processed for a predetermined amount of time.

10. The method of claim 6, wherein said records are address book entries.

11. The method of claim 6, wherein said inputting step is done through a single point of entry.

12. A computer system for providing a current set of records to a plurality of users, the records having a plurality of fields, the system comprising:

a master database that stores a master set of a plurality of records;

a plurality of terminals in communication with the master database;

each of the terminals storing a subset of the plurality of records;

an input receiving module that receives input regarding updates to the plurality of records from the master database;

a storing modules that stores the updates in the master database;

an indicating module that indicates the fields that have been updated since a previous update;

a retrieving module, responsive to the indicating module, that retrieves one or more updated fields from the master database and provides that to one or more of the terminals;

an updating module, associated with one or more terminals, that updates the subset on a terminal using the updated fields provided by the retrieving module; and a sharing module associated with each terminal that shares the updated fields with at least one other terminal.

13. A computer system according to claim 12, wherein the input receiving module comprises a single point of entry to the storing module.

14. The computer system according to claim 12, wherein the records are address book entries.

15. The computer system according to claim 12, wherein the fields are selected from the group consisting of:

user name, electronic mail address, telephone number, address, job title, job department, and employer.

16. A computer system according to claim 12, wherein the indicating module is a field containing a date stamp.

17. A computer usable medium having computer readable code embodied therein for providing a current set of records to a plurality of users, the records having a plurality of fields, the medium comprising:

database storing computer readable code that stores a master set of a plurality of records in a master database;

subset storing computer readable code that stores a subset of the plurality of records;

input receiving computer readable code that receives input regarding updates to the plurality of records from the master database;

update storing computer readable code that stores the updates;

update indicating computer readable code that indicates the fields that have been updated since a previous update;

field retrieving computer readable code that retrieves one or more updated fields and provides that to one or more terminals;

terminal updating computer readable code that updates the subset on the one or more terminals using the updated fields provided by the field retrieving computer readable code; and field sharing computer readable code that shares the updated fields with at least one other terminal.

18. The medium of claim 17, wherein the records are address book entries.

19. The medium of claim 17, wherein the fields are selected from the group consisting of:

user name, electronic mail address, telephone number, address, job title, job department, and employer.

20. The medium of claim 17, wherein the update indicating computer readable code updates the fields using a date stamp.

* * * * *

UNITED STATES PATENT AND TRADEMARK OFFICE
CERTIFICATE OF CORRECTION

PATENT NO. : 6,073,141
DATED : June 6, 2000
INVENTOR(S) : Fernando Salazar

It is certified that error appears in the above-identified patent and that said Letters Patent are hereby corrected as shown below:

At col. 4, lines 48-67 and col. 5, lines 1-7, delete Claim 1 in its entirety and replace with:

--1. A computer system for providing a current set of records to a plurality of users, the records having a plurality of fields, the system comprising:

a master database means for storing a master set of a plurality of records, the records having a plurality of fields;

a plurality of terminals in communication with said master database means;

each of said terminals storing a subset of said plurality of records;

storing means for storing said updates in said master database means;

indicating means for indicating the fields that have been updated since a previous update;

retrieving means, responsive to the indicating means, for retrieving one or more updated fields from the master database means and providing the one or more updated fields to one or more of said terminals;

assigning means for assigning one or more priorities to the one or more updated fields, wherein the assigning means assigns the one or more priorities according to an auto update feature; and updating means, associated with one or more terminals, for updating the subset on a terminal using the updated fields provided by the retrieving means, wherein the updating means updates the subset based on the one or more priorities assigned to the updated fields.--

UNITED STATES PATENT AND TRADEMARK OFFICE
CERTIFICATE OF CORRECTION

PATENT NO. : 6,073,141
DATED : June 6, 2000
INVENTOR(S) : Fernando Salazar

It is certified that error appears in the above-identified patent and that said Letters Patent are hereby corrected as shown below:

At col. 5, lines 20-41, delete Claim 6 in its entirety and replace with:

--6. A method for providing a current set of records having a plurality of fields to a plurality of users, the method comprising the steps of:
storing a master set of a plurality of records in a master database means, the records having a plurality of fields;
providing a plurality of terminals in communication with said master database means;
storing a subset of said plurality of records in each of said terminals;
storing said updates in said master database means;
indicating the fields that have been updated since a previous update;
retrieving one or more updated fields from the master database means and providing the one or more updated fields to one or more of said terminals;
assigning one or more priorities to the one or more updated fields, wherein the assigning means assigns the one or more priorities according to an auto update feature; and
updating the subset on a terminal using the updated fields provided by the retrieving means, wherein the updating means updates the subset based on the one or more priorities assigned to the updated fields.--

In Claim 8, at col. 5, line 44, after "claim 7," insert --further comprising the step of sharing the updated fields with at least one other terminal--.

UNITED STATES PATENT AND TRADEMARK OFFICE
CERTIFICATE OF CORRECTION

PATENT NO. : 6,073,141
DATED : June 6, 2000
INVENTOR(S) : Fernando Salazar

It is certified that error appears in the above-identified patent and that said Letters Patent are hereby corrected as shown below:

At col. 5, lines 51-65 and col. 6, lines 1-14, delete Claim 12 in its entirety and replace with:

--12. A computer system for providing a current set of records to a plurality of users, the records having a plurality of fields, the system comprising:
 a master database that stores a master set of a plurality of records;
 a plurality of terminals in communication with the master database;
 each of the terminals storing a subset of the plurality of records;
 a storing modules that stores the updates in the master database;
 an indicating module that indicates the fields that have been updated since a previous update;
 a retrieving module, responsive to the indicating module, that retrieves one or more updated fields from the master database and provides the one or more updated fields to one or more of the terminals;
 an assigning module that assigns one or more priorities to the one or more updated fields, wherein the assigning means assigns the one or more priorities according to an auto update feature; and
 an updating module, associated with one or more terminals, that updates the subset on a terminal using the updated fields provided by the retrieving module, wherein the updating means updates the subset based on the one or more priorities assigned to the updated fields.--

UNITED STATES PATENT AND TRADEMARK OFFICE
CERTIFICATE OF CORRECTION

PATENT NO : 6,073,141
DATED : June 6, 2000
INVENTOR(S) : Fernando Salazar

It is certified that error appears in the above-identified patent and that said Letters Patent are hereby corrected as shown below:

In claim 17, at col. 6, delete lines 27-44, replace with:

--17. A computer usable medium having computer readable code embodied therein for providing a current set of records to a plurality of users, the records having a plurality of fields, the medium comprising:

database storing computer readable code that stores a master set of a plurality of records in a master database;

subset storing computer readable code that stores a subset of the plurality of records;

update storing computer readable code that stores the updates;

update indicating computer readable code that indicates the fields that have been updated since a previous update; --

UNITED STATES PATENT AND TRADEMARK OFFICE
CERTIFICATE OF CORRECTION

PATENT NO. : 6,073,141

DATED : June 6, 2000

INVENTOR(S) : Fernando Salazar

It is certified that error appears in the above-identified patent and that said Letters Patent is hereby corrected as shown below:

In Claim 17, at col. 6, delete lines 45-54, replace with:

--field retrieving computer readable code that retrieves one or more updated fields and provides the one or more updated fields to one or more terminals;

priority assigning computer readable code that assigns one or more priorities to the one or more updated fields, wherein the priority assigning computer readable code assigns the one or more priorities according to an auto update feature; and

UNITED STATES PATENT AND TRADEMARK OFFICE
CERTIFICATE OF CORRECTION

PATENT NO. : 6,073,141

DATED : June 6, 2000

INVENTOR(S) : Fernando Salazar

It is certified that error appears in the above-identified patent and that said Letters Patent is hereby corrected as shown below:

terminal updating computer readable code that updates the subset on the one or more terminals using the updated fields provided by the field retrieving computer readable code, wherein the terminal updating computer readable code updates the subset based on the one or more priorities assigned to the updated fields.--

Signed and Sealed this

Twenty-seventh Day of March, 2001

*Attest:*

NICHOLAS P. GODICI

*Attesting Officer*

*Acting Director of the United States Patent and Trademark Office*